INVENTOR
ADAM R. MILLER
BY James J. O'Connell
ATTORNEY

United States Patent Office 3,790,550
Patented Feb. 5, 1974

3,790,550
FLUID BED POLYMERIZATION PROCESS
Adam R. Miller, South Charleston, W. Va., assignor to Union Carbide Corporation, New York, N.Y.
Original application Nov. 21, 1969, Ser. No. 878,774. Divided and this application Oct. 26, 1971, Ser. No. 192,195
Int. Cl. C08f 3/06, 15/40, 1/00
U.S. Cl. 260—94.9 P          10 Claims

ABSTRACT OF THE DISCLOSURE

Polymerization catalysts in the form of dry powders are continuously fed to a fluidized bed reactor under essentially plug-flow conditions by a sequential repetition of the steps of dispensing under controlled conditions, a desired quantity of catalyst from a catalyst supply source to a chamber which is alternately communicable with such supply source and the reaction zone of the fluidized bed reactor, isolating the dispensed catalyst from the catalyst supply source, exposing the dispensed catalyst to the reaction zone of the fluidized bed reactor and rapidly injecting the catalyst into the reaction zone with a carrier gas.

This patent application is a division of application Ser. No. 878,774 filed Nov. 21, 1969.

BACKGROUND OF THE INVENTION

Considerable attention has recently been focused on the fluidized bed reactor as a tool for the polymerization of gaseous monomers to solid particulate polymers, particularly olefin polymers, with solid powdery catalysts. Fluidized bed reactors for the production of particulate polymers may be generalized as operating by continuously feeding a dry powdery catalyst and a gaseous stream containing the polymerizable monomer to a fluidized bed of formed and forming polymer particles, while removing heat and a portion of the bed as the product. The only raw materials required are the polymerizable monomers, catalyst and any modifying or diluting gases. As no solvents are employed in the system, the fluidized bed reactor represents a promising tool for lowering polymer production costs.

To avoid subsequent catalyst recovery steps requires the use of highly active catalysts such as, in the instance of polyolefin production, the silyl chromate catalysts disclosed in U.S. Pat. 3,324,101 to Baker and Carrick and U.S. Pat. 3,324,095 to Carrick, Karapinka, and Turbett which are hereby incorporated by reference. In addition to being highly active, these catalysts when supported on a porous support, show an ability to subdivide to produce a multitude of polymer particles from a single catalyst particle. Polymer particles so produced are so low in catalyst residue that they can be used directly without catalyst recovery.

When using a highly active catalyst, a problem exists in feeding a concentrated mass of catalyst to a reactor. There is a tendency for a localized run-away reaction in or about the catalyst feed system to occur due to initiation of polymerization with a concentrated mass of catalyst particles. This results in plugging of the feed system. A need therefore exists for a system to feed catalysts to a fluid bed reactor continuously, without recurrent shutdowns due to plugging as caused by adverse polymerization phenomena.

SUMMARY OF THE INVENTION

It has now been found that dry powdery polymerization catalysts can be effectively and continuously fed to a fluid bed reactor under essentially plug-flow conditions by a sequential repetition of the steps of dispensing under controlled atmosphere conditions, a desired quantity of catalyst from a catalyst supply source to a chamber which is alternately communicable with the catalyst supply source and reaction zone of a fluidized bed reactor, isolating the dispensed catalyst from the catalyst supply source, exposing the dispensed catalyst to the reaction zone of a fluidized bed reactor and rapidly injecting the catalyst into the fluid bed reactor with a carrier gas. In this manner catalyst concentration in the reaction zone can be effectively controlled by varying the amount of catalyst dispensed from the catalyst supply source during each cycle or by varying the time intervals between injections of predetermined quantities of catalyst into the reactor. As will be appreciated, the process of this invention makes possible the supply of finely divided catalyst in a form and under conditions which approach those of plug-flow for cohesive masses. In effect then, when considering the finely divided state of the catalyst and the dispersing effect due to the velocity of the carrier gas, the catalyst can be said to be supplied in more or less discrete units somewhat comparable to that of ideal plug-flow.

According to this invention there is also provided an apparatus for the plug-flow or discrete unit feeding of catalyst into a fluidized bed reactor.

DRAWINGS

DESCRIPTION

In one embodiment of this invention there is provided a method for feeding catalysts under plug-flow conditions into a fluidized bed reactor by dispensing small units of catalyst particles which are sequentially injected into the reactor by a carrier gas stream. The catalyst prior to injection is stored in some reservoir normally under an inert gas to protect it from poisons prior to use.

Figure 1:
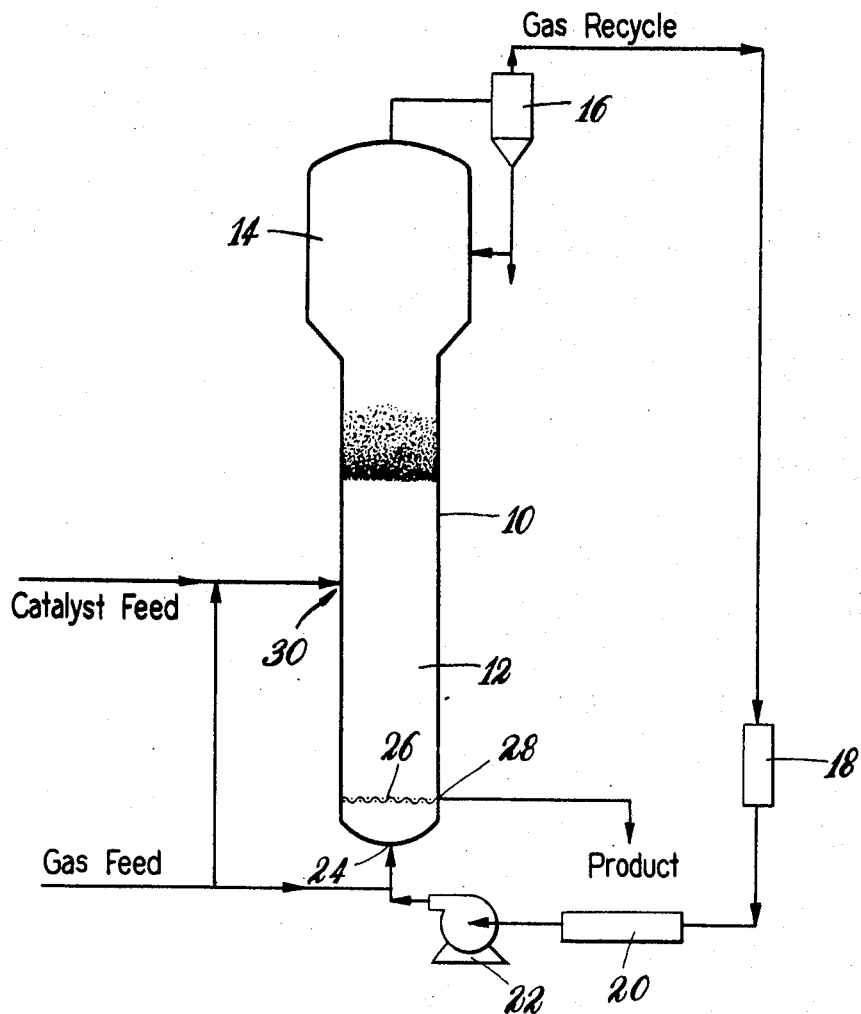
FIG. 1 is a schematic representation of a fluid bed reactor.

The operation of the catalyst feed system of this invention can be better understood by an explanation of its role in the total operation of a fluid bed reactor. With reference now to FIG. 1, the fluid bed reaction system comprises a reactor 10, which generally consists of a reaction zone 12 and a velocity reduction zone 14. The reaction zone 12 comprises a bed of growing polymer particles, formed polymer particles and catalyst fluidized by a continuous upward flow of polymerizable and modifying gaseous components in the form of feed and recycle gases through the reaction zone. To maintain a viable fluidized bed, mass gas flow is typically in the order of from 2 to about 6 $G_{mf}$ or more, with fluidization achieved by a high rate of gas recycle to and through the bed typically in the order of about 50 times the rate of feed abbreviation for the minimum mass gas flow required to achieve fluidization, C. Y. Wen and Y. H. Yu, "Mechanics of Fluidization," Chemical Engineering Progress Symposium Series, vol. 62, pages 100–110 (1966). In general, the fluidized bed appears as a dense mass of viable particles in possible free vortex or bubbling flow as created by the perculation of gas through the bed with free vortex or bubbling flow established by the fact that axial pressure drop through the bed generally is only in the order of about 1 p.s.i.g.

In the normal or continuous operation of the fluidized bed, makeup gas is fed to the bed at a rate about equal to the rate at which a portion of the bed is withdrawn as product. That portion of the gaseous stream which does not react in the bed constitutes recycle gas which is removed from a polymerization zone preferably by passing it into velocity reduction zone 14 wherein retained particles or fines are given an opportunity to return to the bed. Return may be further aided by a cyclone 16 which may be part of the velocity reduction zone or exterior thereto. The recycle gas is then typically passed through a filter 18 to remove more fine particles, through a heat exchanger 20 and compressor 22 where it is stripped of heat of reaction before it is returned to the bed at point 24 below a distributor plate 26 which serves to diffuse the gas through the bed to keep the particles at the base of the bed viable and to support a quiescent bed of resin particles when the reactor is not in operation.

The most unique feature of a fluidized reactor bed system for the production of solid particulate polymers is that, with the possible exception of start up, the bed is the product. Accordingly, as new bed is created through polymerization, an equal portion is withdrawn as product preferably at about the base of the bed 28.

When used for polymerization of olefins, hydrogen is typically a normal component of the gaseous stream to modify melt index of polymers produced in the bed. Other gases, such as nitrogen and like may also be present as diluents.

Fluidized bed reactors normally operate at pressures from about 40 to 300 p.s.i. or more and at temperatures ranging from the minimum polymerization temperatures for polymers to be prepared therein up to some temperature below the sintering point of the polymers being produced. In the polymerization of olefins this upper temperature is about 100° C.

Dry powdery catalysts used for the polymerization of the monomers in a fluidized bed reactor are normally injected into the bed at a point 30 which is preferably above distribution plate 26 and more preferably from about ¼ to ¾ of the height of the bed.

In a typical system catalyst concentration in the bed will range from about 0.001 to about 0.50 percent of bed volume depending on productivity desired. While catalyst concentration in the bed is small, catalyst concentration in the feed system is extremely high, and it has been difficult to maintain continual feed for long periods of time due to plugging of the feed system as mainly caused by reactions initiating in or about the catalyst feed system.

It has been found that catalyst concentrations in a fluidized bed reactor can be maintained within desired levels when fed under timed plug or unit flow conditions. Using plug-flow feed and suitable apparatus, it has further been found that plugging can be substantially eliminated without interfering with substantially steady state operation of the reactor.

Figure 2:
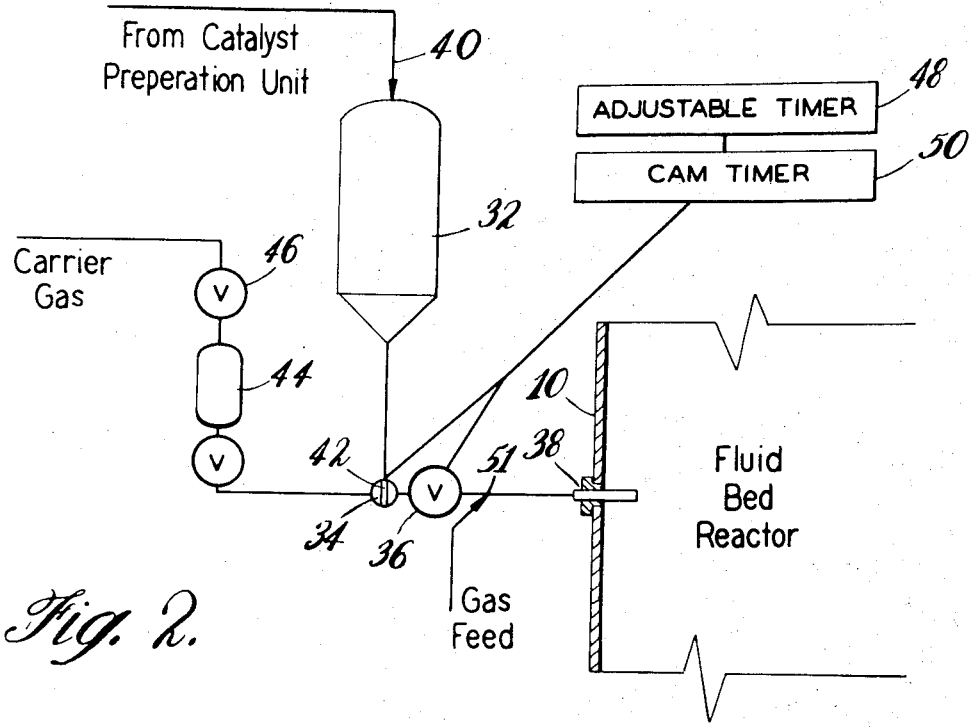
FIG. 2 is a schematic illustration of an apparatus for injecting catalyst into a fluid bed reactor depicted in FIG. 1 under plug-flow conditions.

The schematic diagram of FIG. 2 may be used to illustrate and explain the method and associated apparatus for feeding catalyst to a fluidized bed reactor under conditions of this invention. Apparatus as schematically illustrated in FIG. 2 is normally placed in close proximity to the fluid bed reactor 10 and generally includes catalyst reservoir 32 which supplies catalyst for injection to the reactor through sequential operation of metering valve 34 and valve 36, the catalyst entering the reactor through inlet tube 38.

More specifically, the dry powdery catalyst is fed from a preparation unit, not shown, to the catalyst reservoir 32 where it is kept under an inert atmosphere conveniently supplied through catalyst feed line 40. Reservoir 32 is connected to a chambered metering valve 34, whose port or chamber 42 is pneumatically, electrically or otherwise actuated to be in line as shown, with the outlet of reservoir 32 or in line with inlet tube 38, typically its normal position.

When a charge of catalyst is called for, the chamber 42 of the metering valve 34 is turned to face the outlet of the catalyst reservoir 32 and dry powdery catalyst is allowed to fill the chamber. Chamber 42 is then turned to face inlet tube 38. Valve 36 is opened and a surge of carrier gas, which may be the reactive monomer, a modifying gas, inert gas, mixtures thereof and the like from gas reservoir tank 44, is allowed to blow catalyst particles from chamber 42 of metering valve 34 through valve 36 and inlet tube 38 into the reactor before a deleterious reaction can possibly begin in a zone between valve 34 and inlet tube 38. An orifice valve 46 may be conveniently placed ahead of gas reservoir 44 so that a controlled volume of gas will be accumulated at a pressure greater than the reaction pressure, preferably from about 1.1 or 1.2 to about 1.5 or 2 times reactor-pressure, and to prevent a continued flow of gas through metering valve 34 between injections. The operation of metering valve 34 and valve 36 may be conveniently controlled by a cam timer 50 whose sequence of operation is in turn controlled by an adjustable timer 48 which actuates the cam timer and may be set to control the time intervals between catalyst injection. To assure there is no back pressure or flow of polymer particles or catalyst backwards into the catalyst feed system there is preferably supplied a continuous positive flow of gas at point 51 ahead of valve 36 through inlet tube 38.

An important function of catalyst feed system of this invention is to provide a controlled interface between the carrier gas and the catalyst, particularly when the carrier gas is reactive with the catalyst. When the carrier gas is reactive no lasting interface can be tolerated. It is important, in this instance, to have the carrier gas sweep through the feed system at a velocity sufficient to substantially instantly carry all catalyst particles into the reactor. It has been found that with a carrier gas velocity from about 60 to about 90 feet per second each unit charge of catalyst will be effectively carried into the reactor without leaving a residue of catalyst particles in the feed monomer for possible reaction. Lower velocities may be advantageously employed where the carrier gas is inert, however, this could lead to a possible accumulation of particles along the feed system surfaces and their presence could lead to plugging because of catalyst particles sticking when the carrier gas is switched to one of the reactive nature.

In addition to controlling the charge of catalyst which may be fed to the reactor during any one sequence, the metering valve 34 must play the additional function of sealing catalyst reservoir outlet from the carrier gas. Accordingly, valve tolerances must be close since leakage of reactive carrier gas back into the catalyst storage system cannot be tolerated as even a small amount will polymerize and lead to plugging of feed lines or jamming of the valve.

As indicated it is important during any one injection cycle to sweep out of the feed system and into the reactor all catalyst particles so as to prevent a deposition which could lead to a cumulative growth of polymer layers and eventually plug the monomer feed. While aided by the supply of a carrier gas of a sufficiently high velocity, providing all the tubes and valves which comprise the feed system with highly polished surfaces will minimize the deposition of catalyst particles and subsequent formation of polymer layers.

It is contemplated that catalyst systems using silica bases as the support will be used. In this connection supports of a size from about an average of 120 mesh to preferably about 250 mesh are preferred with the large mesh supports having a reduced tendency to accumulate in the feed system. With particles of such size, it has been found that the ordinary density of the particles in the catalyst reservoir ranges from about 15 to about 25 pounds per cubic foot at rest. When metered into the metering valve 34 and exposed to carrier gas having a velocity of from about 60 to 90 feet per second, it is estimated that the bulk density of the particles may be reduced by about 50% without adverse effects.

Time interavls between injections and the volume of injected catalyst particles depend on many factors including productivity of the catalyst and the nature of the carrier gas. It has been found that depending on productivity (unit weight of polymer per unit weight of catalyst per hour), catalyst injections can be varied from one per minute or less to as few as about 1 per 120 minutes or more without materially upsetting the steady state operation of the reactor. This variation is made possible inasmuch as the fluidized bed appears to have a great tolerance to self average its inputs and significant changes in input of catalyst particles have been observed to be required to upset an essentially steady-state operation.

As indicated, the fluidized bed reactor appears to be quite flexible in the amount of catalyst it can accept in each injection without displaying an adverse reaction. It is considered that the major limit is that amount which would at least initially increase the heat of reaction beyond that which the heat exchange system is capable of removing.

The nature of the carrier gas is of consideration to any determination of the rate of catalyst injection, assuming the quantity is not destined to overload the system. The ideal rate of injection is equal to the rate of catalyst consumption. It is usually only feasible to operate close to this rate where the carrier gas is inert or substantially inert to the catalyst. This can be achieved where the carrier gas must be inert gas, because the monomer is too active to be brought into contact with any concentrated amount of catalyst particles. When conditions as this exist, inert gases such as argon, helium, nitrogen and the like can be used to give greatest assurances of trouble free operation. As they are diluents, however, they will accumulate in the reactor over long periods of time and must be periodically vented to avoid diminution in productivity.

Rapid sequential injection is also feasible where a modifying gas, which does not per se possess reactivity to the catalyst, such as hydrogen, is employed as the carrier gas. Thus, it can be diverted from the main feed for use as the carrier gas. This is most feasible when the amount of modifying gas required in a particular reaction is sufficiently high to permit its use as the exclusive carrier gas without fear of build-up of excess quantities. Where lower amounts of modifying gas are to be present in the reactor system a modifying gas may be used but venting may also be required from time to time.

Catalyst may also be injected at a rate substantially equal to its consumption through use of comonomer. Comonomers normally are less reactive than the major monomer content of a gas feed stream. Where required in adequate amounts, comonomers too can be diverted from the main gas feed stream for use as the carrier gas in the same manner as modifying gas.

Where it is necessary to use monomer as all or part of the carrier gas as in the instance of homopolymerization in the absence of modifying gases, it is preferred to maximize time intervals, in the manner previously indicated, between catalyst injections. It is estimated that more than 99% of all particles are carried into the reactor with each charge of carrier gas. Between injection intervals the continual gas fed at point 51 acts to sweep the remaining particles into the reactor.

Proper adjustment of the pressures of blanketing gas in catalyst reservoir 32 and gas reservoir 44 also assures more satisfactory operation. The pressure of the blanketing gas applied to catalyst reservoir 32 should be equal or exceed the pressure applied to gas reservoir 44 and exceed the pressure within the reactor to prevent the possibility of any back up of catalyst particles and reactive monomer into the feed system. The pressure reached in gas reservoir 44 should also be preferably greater than reaction pressure to assure that flow will always be positive in the reactor direction. In addition, the pressure of that portion of monomer fed at point 51 should exceed reactor pressure.

Consideration mut also be given to the sequence of injections as a function of catalyst productivity. A sequence can be set manually or automatically on a schedule preferably based on temperature differences between input and recycle gases. The greater the temperature difference the more vigorous the reaction. Since the object is to maintain normally a substantially steady state operation, a constant temperature difference is preferred. Catalyst injection may be increased or decreased stepwise by trial and error to achieve steady state operation. This adjustment of rate of injection may be achieved automatically, for instance, by detecting temperature differences with thermocouples whose outputs are converted by a transducer to a pneumatic signal which is in turn fed to a servo valve which adjusts the operation of timer 48 which in turn controls cam timer 50 to seek and eventually adjust to the temperature differential sought. Without being limited, as an alternative, it is within the ambit of this invention to employ a device like a computer to calculate the amount of heat generated in the reactor and use this information to continually adjust a timer mechanism to achieve a rate which will hold heat of reaction at a constant level.

Figure 3:
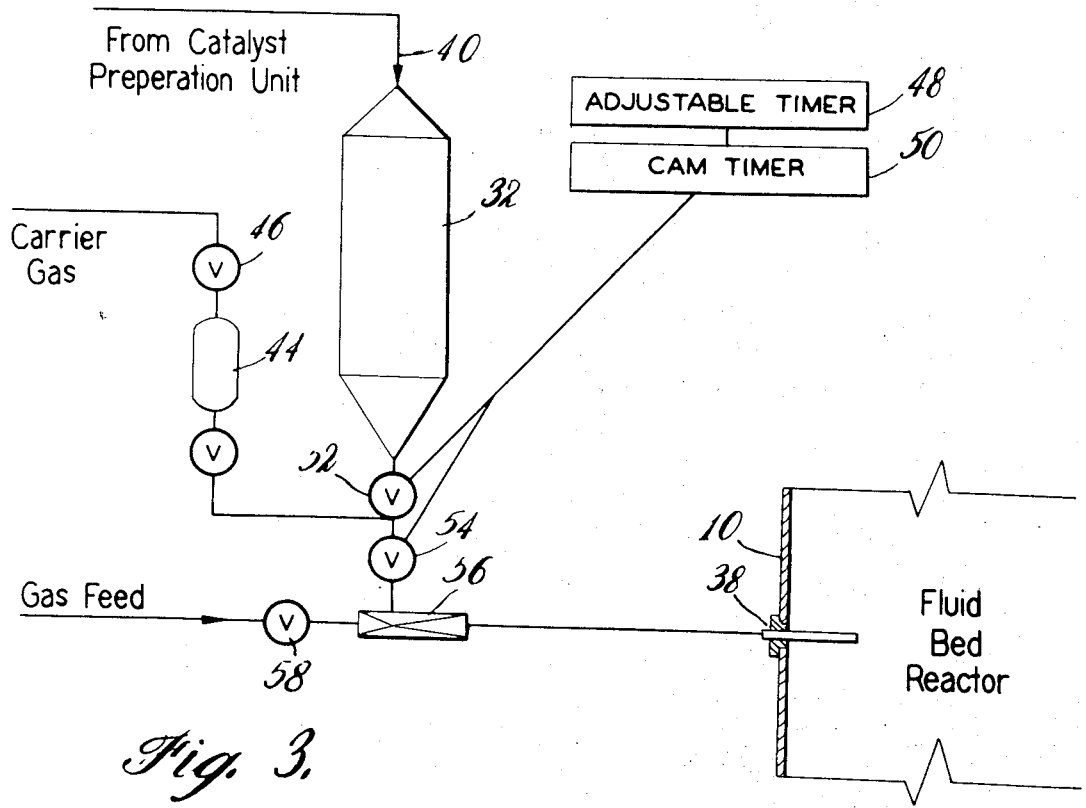
FIG. 3 is a schematic illustration of another apparatus for the plug-flow injection of the catalyst into a fluid bed reactor.

Without being limited, there is included within the scope of this invention the apparatus of the schematic illustration shown in FIG. 3 which is also utile in achieving trouble-free injection of catalyst into the reactor. Again catalyst is contained in reservoir 32 under a blanket of inert gas supplied to line 40. When a charge of catalyst is called for, a mechanism controlled by a suitable means such as adjustable timer 48 and cam timer 50 opens valve 52 while maintaining valve 54 in a closed condition to allow catalyst to meter into the zone between valves 52 and 54. Valve 52 then closes, valve 54 opens, allows the carrier gas to shove the particles of catalyst over into venturi valve 56. The flow of feed gas there blows the catalyst charge into the reaction zone of the fluidized bed through tube 38 mounted on a wall of reactor 10. All of the operating criteria and consideration necessary to the utility of the system shown in FIG. 2 apply to the system shown in FIG. 3 with one additional requirement, that being to preferably provide a check valve 58 which precludes gas pressure in the feed falling below reactor pressure or below carrier gas pressure.

Example I

An ethylene polymerization catalyst was prepared by first depositing bis-triphenyl silyl chromate on a silicon support of the following composition:

| Component: | Weight percent, dry bases |
|---|---|
| $Al_2O_3$ | 0.0 |
| $SiO_2$ | 99.95 |
| $Na_2O$ | .05 |
| $So_4$ | 0.0 | and having the following physical characteristics:

| Mesh size, U.S. standard: | Weight percent larger than— |
|---|---|
| 60 | 0.0 max. |
| 100 | 4.0 max. |
| 140 | 10.0 max. |
| 200 | 9 to 33. |

Surface area: 338 sq. meter per gram.
Pore diameter (average): 170 angstroms.

The deposited bis-triphenyl silyl chromate was then reduced with ethoxydiethyl aluminum in a ratio of about 12 moles of ethoxydiethyl aluminum per mole of bis-triphenyl silyl chromate to provide the desired catalyst.

To the fluidized bed reactor system shown in FIG. 1 having a reactor diameter of 8 feet and capable of operating with a nominal bed depth of polyethylene particles of about 20 feet there was attached a catalyst feed system of the type depicted in FIG. 2. The polymerization catalyst is stored in the reservoir under a nitrogen blanket and fed to the reactor using nitrogen as the carrier gas. Ethylene was polymerized in the presence of one percent by weight of hydrogen and 3 percent by weight of butene at a reaction temperature of 90° C. and a reactor pressure of 260 p.s.i.g. Under these conditions the carrier gas pressure and the inlet tube sweep gas pressure were maintained at 320 p.s.i.g. so as to provide a carrier gas velocity in the inlet tube of from 60 to 90 feet per second during catalyst injection. Injection of the catalyst particles occured in units at intervals of one injection per hour up to one injection per two hours, depending upon the reaction temperature, and in a volume to provide a catalyst concentration in the reaction zone of from .05 to 0.1 percent of the bed volume. Over the period of catalyst injection by the process described, continuous particulate polyethylene production at the rate of 3,000 pounds of polyethylene per pound of catalyst was obtained without disruption in catalyst feed (due to plugging) or steady state operation.

Example II

Using the fluidized bed reactor system and the catalyst feed system employed in Example I, a bis-triphenyl silyl chromate deposited on a silica support having an average diameter of about 100 microns and activated with 12 moles of ethoxydiethyl aluminum per mole of silyl chromate was fed with a nitrogen carrier gas in units of 0.6 pound at intervals of from 30 to 60 minutes to the reactor. Under ethylene polymerization conditions, in the presence of one percent by weight of hydrogen and a minor amount of butene, of 90° C. reactor temperature and 100 p.s.i.g. reactor pressure, the carrier gas pressure and the inlet tube sweep gas pressure were set and maintained at 130 p.s.i.g. to provide a carrier gas velocity varying from 60 to 90 feet per second. The catalyst concentration was maintained at from 0.05 to 0.10 percent of bed volume during the reaction period and from 1000 to 2000 pounds of particulate polyethylene per pound of catalyst was produced during the reaction period without disruption in catalyst feed or steady state operation.

Example III

Following the procedure of Example I, ethylene was polymerized in the presence of 4.8 percent by weight of hydrogen at a reaction temperature of 97° C. and a reactor pressure of 260 p.s.i.g. using a catalyst of bicyclopentadienyl chromium deposited on a silica support having an average diameter of about 100 microns. The catalyst was fed from the feed system shown in FIG. 2 with the aid of nitrogen as the carrier gas at an injection rate of one every 60 to 75 minutes and at a unit volume so as to maintain catalyst concentrations of from 0.033 to 0.067 percent of bed volume. The carrier gas pressure and the inlet tube sweep gas pressure were maintained at 320 p.s.i.g. and the velocity of the carrier gas during injection was in the range of from 60 to 90 feet per second. From 1500 to 3000 pounds of particulate polyethylene per pound of catalyst was produced over the reaction period without disruption of the polymerization process.

What is claimed is:

1. In a process for the catalytic polymerization of at least one gaseous monomer with particulate catalytic particles in a fluidized bed of particles formed of the polymerization product derived therefrom, said fluidized bed being maintained in the reaction zone of a fluid bed reactor under a reaction pressure of at least 40 p.s.i. and having a mass gas flow therethrough of at least 2 to 6 $G_{mf}$, the method of injecting catalyst particles into said reaction zone which comprises the sequential steps of:
(a) dispensing a quantity of catalyst particles from a supply source to a chamber which is alternately communicable with said supply source and said reaction zone,
(b) isolating the dispensed catalyst particles from said catalyst supply source,
(c) exposing the dispensed catalyst particles to said reaction zone, and
(d) injecting the dispensed catalyst particles into the side of said reaction zone at a velocity of about 60 to 90 feet per second with a carrier gas which is under a pressure of from about 1.1 to about 2.0 times the pressure in said reaction zone, said sequence of steps being accomplished at the rate of about one such sequence per minute to about one such sequence per 120 minutes, and so as to maintain an active catalyst concention in said reaction zone of from about 0.001 to about 0.50 percent of the volume of the of the fluidized bed therein.

2. A process as claimed in claim 1 in which said gaseous monomer comprises at least one polymerizable olefin monomer.

3. A process as claimed in claim 2 in which said gaseous monomer comprises ethylene.

4. A process as claimed in which the carrier gas is inert to the catalyst particles.

5. A process as claimed in claim 1 in which the carrier gas pressure is about 1.2 to about 1.5 times the reactor pressure.

6. A process as claimed in claim 1 in which a continuous positive flow of gas is maintained in the zone between the catalyst particle reception chamber and the reaction zone of the fluidized bed reactor in the direction of said reaction zone.

7. A process as claimed in claim 1 in which the rate of injection of catalyst particles is sufficient to maintain an active catalyst concentration in said reaction zone of from about 0.05 to about 0.1 percent of the volume of said fluidized bed volume.

8. A process as claimed in claim 1 in which the reaction pressure in said reactor is about 40 to 300 p.s.i.

9. A process as claimed in claim 7 in which the rate of catalyst injection is from about one per 60 minutes to about one per 75 minutes.

10. A process as claimed in claim 1 in which the dispensed catalyst is injected into the side of the reaction zone at a point which is located between about the top and bottom quarter of said fluid bed.

References Cited

UNITED STATES PATENTS

| | | | |
|---|---|---|---|
| 3,023,203 | 2/1962 | Dye | 260—94.9 P |
| 3,012,024 | 12/1961 | Kavesh | 260—95 R |

JOSEPH L. SCHOFER, Primary Examiner

A. HOLLER, Assistant Examiner

U.S. Cl. X.R.

260—88.2 B, 88.2 R, 93.7, 94.9 DA, 95 R

UNITED STATES PATENT OFFICE
CERTIFICATE OF CORRECTION

Patent No. 3,790,550     Issue Date   February 5, 1974

Inventor(s) Adam R. Miller

It is certified that error appears in the above-identified patent and that said Letters Patent are hereby corrected as shown below:

All the drawings recited in column 2, lines 26 to 34, should be attached to the patent.

Column 2, line 58, after "feed" insert --of makeup gas. $G_{mf}$ is used in the accepted form as the--.

Column 4, line 72, correct the spelling of --intervals--.

Column 5, line 73, correct the spelling of --must--.

Column 8, claim 4, line 1, after "claimed" insert --in claim 1--.

Signed and sealed this 17th day of December 1974.

(SEAL)
Attest:

McCOY M. GIBSON JR.
Attesting Officer

C. MARSHALL DANN
Commissioner of Patents